J. C. SMITH.
THREADING TOOL.
APPLICATION FILED SEPT. 8, 1910.
1,041,362.
Patented Oct. 15, 1912.
3 SHEETS—SHEET 3.
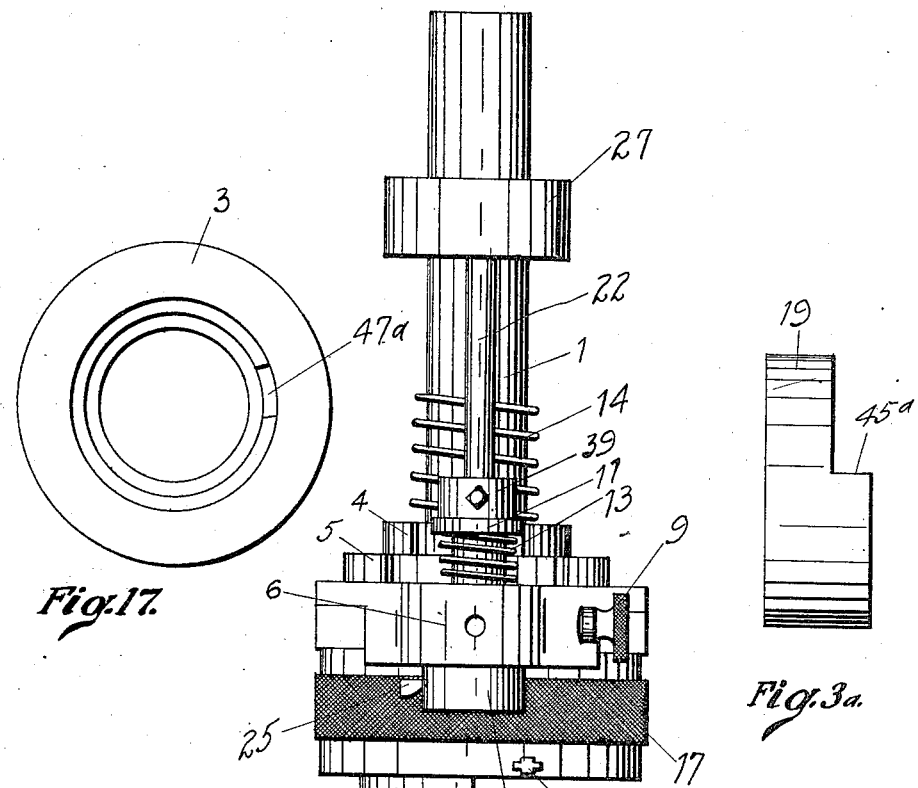
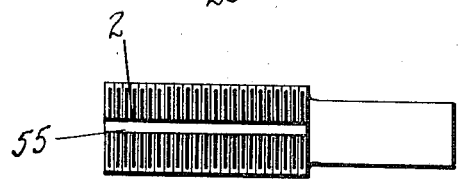
WITNESSES:
Paul A. R. Kroesing.
Lotta Lee Bray.
INVENTOR
John C. Smith
BY
Parker & Burton
ATTORNEYS

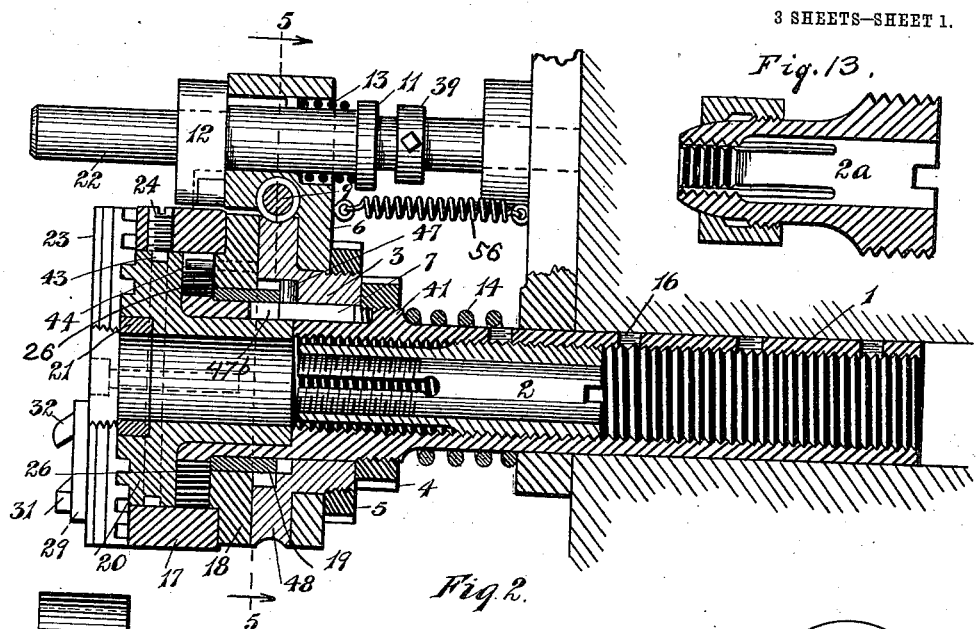
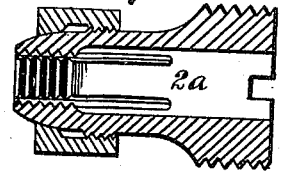
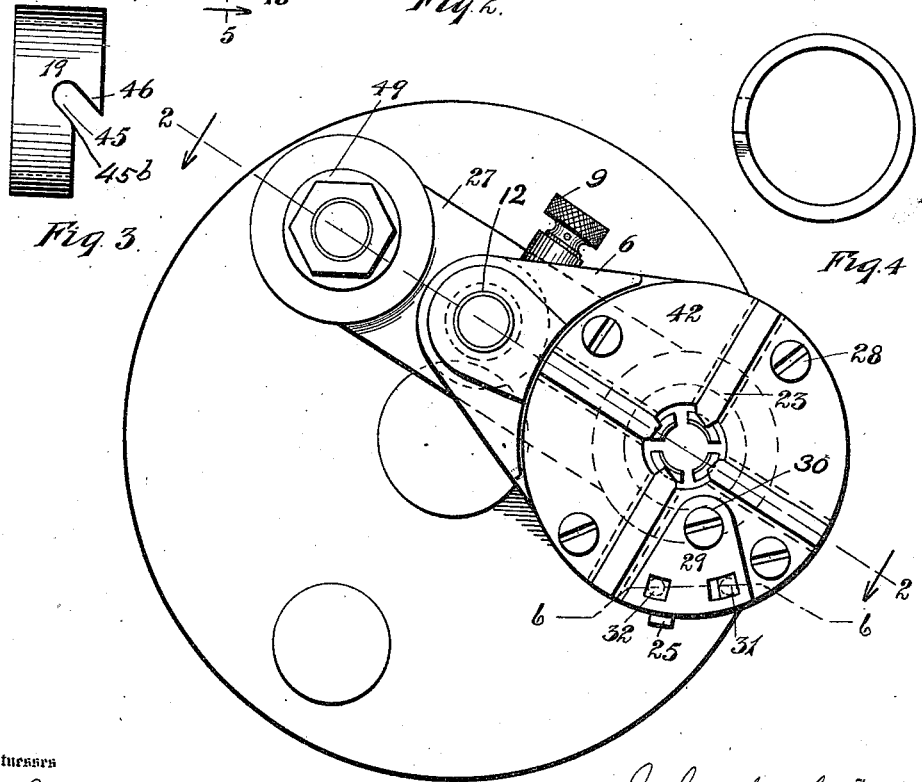

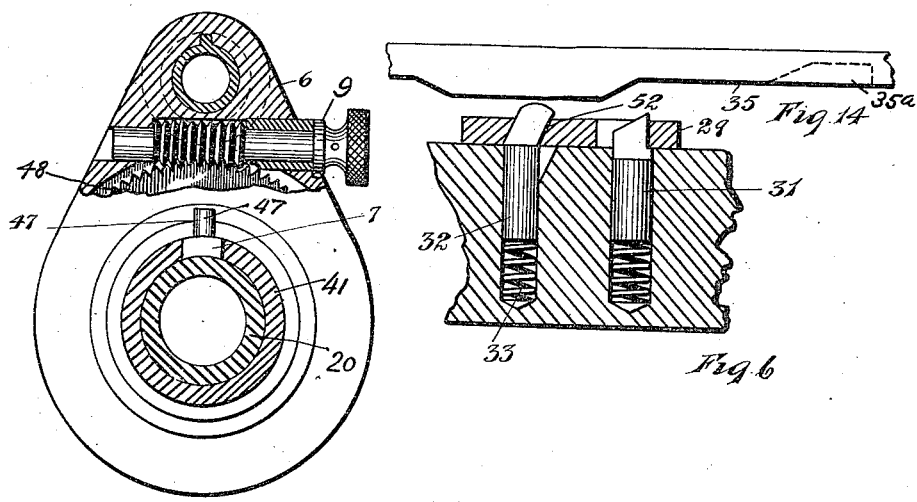
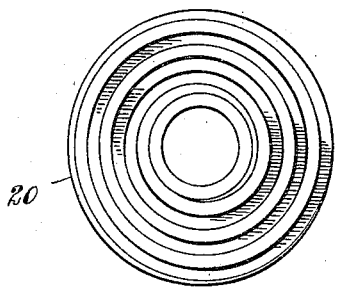
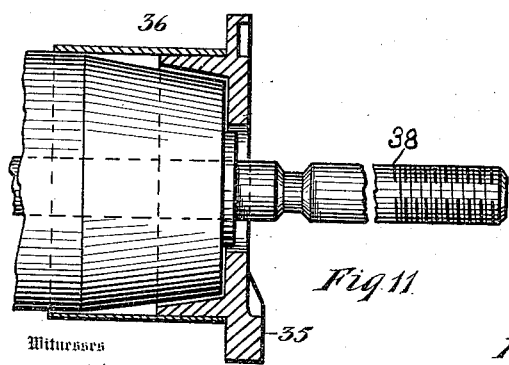
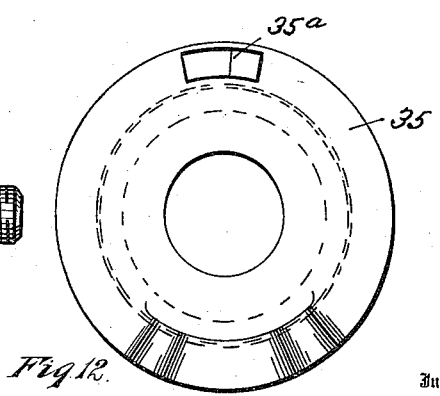

UNITED STATES PATENT OFFICE.

JOHN C. SMITH, OF DETROIT, MICHIGAN.

THREADING-TOOL.

1,041,362.　　　　　Specification of Letters Patent.　　Patented Oct. 15, 1912.

Application filed September 8, 1910. Serial No. 581,050.

*To all whom it may concern:*

Be it known that I, JOHN C. SMITH, a citizen of the United States, residing at Detroit, county of Wayne, State of Michigan, have invented a certain new and useful Improvement in Threading-Tools, and declare the following to be a full, clear, and exact description of the same, such as will enable others skilled in the art to which it pertains to make and use the same, reference being had to the accompanying drawings, which form a part of this specification.

This invention relates to threading tools, and has for its object an improved tool adapted to be used for the purpose of cutting what is known in the market as studs,—a headless screw threaded at both ends and with a portion at the middle of the stud left unthreaded. The tool is used in connection with a screw-cutting machine and consists essentially of two parts that have a limited relative movement with respect to each other and are also rotatable and slidable together into and out of the turret. A third part is stationary so far as rotative movement is concerned, but slides together with the first two mentioned parts into and out of the turret. These parts, however, are made up of numerous subsidiary parts in order that the tool may be conveniently assembled and disassembled. For the sake of clearness, the first two parts will be designated as the scroll and guide element and the cutter holding element, respectively, the third part will be designated as the stop element. These three elements coöperate together with the chuck of the machine which gives the cutter holding element a one-way rotation to close the cutters, thereby putting under tension, a spring that at the proper time is released and gives the cutter holding element a contrary rotation to open the cutters. Provision is also made so that when the chuck has rotated the cutter holding element a predetermined distance, the relative movement between the cutter holding element and the scroll and guide element is stopped and the two rotate together until the rotation of the chuck is reversed. This avoids injury to the parts. The cutter holding element and the scroll and guide element have two points in their relative rotation, fixed by a two shouldered bushing in engagement with a key and pin, at which they become fastened to each other and must rotate together, if at all. Any relative movement, therefore, must be between these two points and cannot be more than the distance between the two shoulders which, as hereinafter described, is about 180 degrees. By holding said two elements from relative rotation and from rotation together at different points along said 180 degrees of allowable relative movement, the depth to which the cutters close in is regulated. Means is provided by which the cutter holding element and the scroll and guide element are holdable at different points along the arc of allowable relative movement. Means for setting the machine to cut threads over variable distances upon the stock is afforded, that is, the amount of the stud threaded may be varied as desired.

One of the chief features of the invention is that the cutters do not do their own guiding, but during the cutting operation, the stock is guided through the cutters by either a split nut or by a spring die, thereby insuring accurate threading.

Another very important feature is that the threading of both ends of the stud may be done automatically on the same screw machine; the external ends of the stock may be threaded on a die head (not shown) set in one of the other turret holes and then be fed to the split nut, above referred to, or the threading at both ends may be done by one operation by the tool shown in the drawings, a spring die being used to cut the threads as the tool slides onto the stock and to guide the stock as the tool backs away from the stock and the cutters in the cutter holding element cut the thread on the other end of the prospective stud.

In the drawings:—Figure 1, is a front elevation of the tool located in the turret of an automatic machine. Fig. 2, is a longitudinal section along the axis of the tool head and tool shank, as indicated by the lines 2—2 Fig. 1. Fig. 3, is a detail of half the bushing showing the hook employed to control the relative movement between the cutter-holding housing and the scrolled head. Fig. 3ª, is a detail of the other half of the same bushing viewed from the opposite side and showing the shoulder that acts as a stop. Fig. 4, is an elevation of the bushing of Figs. 3 and 3ª. Fig. 5, is a section at the line 5—5 of Fig. 2. Fig. 6, is a section at line 6—6 of Fig. 1. Fig. 7, is a detail view of the scroll which actuates the cutters. Fig. 8, is a side view of a cutter. Fig. 9, is a cross section of a cutter. Fig. 10, is a reverse plan view of bracket stop 12 on rod 22. Fig. 11, is a longitudinal section of the sleeve used in connection with the tool. Fig. 12, is a front elevation of the sleeve used in connection with the chuck. Fig. 13, is a longitudinal section of a spring die which may be substituted in the shank of the tool. Fig. 14, is an edge development of the cam face of the sleeve. Fig. 15, is a top elevation of the tool. Fig. 16, in an elevation of the split nut. Fig. 17, is a front elevation of the ring 3 that is part of the stop element.

The shank 1 of the tool is cylindrical, and internally threaded for the greater part of its length; on that part of it which is next adjacent to the head, it is enlarged and threaded externally on the collar 41; forward of the collar 41 it is provided with a cylindrical surface. Forward of the ring bushing 19, the head 20 enlarges to receive a housing ring 17, which covers the enlarged head and is revoluble thereon and is held thereto by race engaging screws 24. The head (indicating at 20 in the drawing) is, for purposes of construction, made as a separate piece from the shank 1, but so closely associated therewith that the two parts are practically integral and are tightly secured together. The housing ring 17 is preferably integral with the face plate which confines the cutters, the guides for which are cut radially in the face plate so that the front appearance resembles sectors of circles rather than an integral plate. The sector-like face plate is secured to the ring 18 by means of screws 28, thus completely housing in the enlarged parts 20 at the head of the tool. The shank 1 is provided at intervals along its length with threaded holes in which are run set screws 16 to hold the member 2 at the selected place. The internal member 2 may be either a split ring or nut, as shown in Figs. 2 and 16, threaded internally to suit the thread of the stud with which it engages; or in place of the split ring the member may be made in the form of a spring or button die; a spring die is shown at 2ª in Fig. 13. A die of either form would cut the thread on the forward end of the stud while with the split nut the forward end of the stud must be previously cut. The shank of the split nut is flattened on one side, as at 55 Fig. 16, against which side the set screws 16 bear when the tool is properly assembled. The face of the head 20 is cut with a spiral (shown in Fig. 7) with which the cutters 23 engage, and the slots in housing 17 which guide said cutters compel them to travel radially when the head 20 is revolved with respect to the housing 17. The housing 17 and the face plate connected with it are held revolubly on the head 20 by means of headless screws 24 that engage through the threaded holes in the walls of the housing 17 with their unthreaded terminals projecting into a race 43 in the head 20. The head is completely housed by a ring 18 forced on a bushing 19 that surrounds the shank at its intermediate part between its largest and smallest diameters, and is secured to the housing 17 by screws 28 inserted from the front into threaded holes that are parallel to the axis of the shank 1. The housing 17 with its face plate in which are located the radial slots in which the cutters travel together with the ring 18, forms the cutter-holding element heretofore spoken of. Immediately at the rear of the enlarged part of the head 20 and between this enlarged part and the ring 18 is an annular cavity in which is inserted a spiral spring 26, one end of which is attached by pin 44 to the ring 18, which ring, as has been stated, is secured to the housing ring 17 and the other end of which is attached to the head 20, either directly to the part 20 or to the enlarged part of the shank 1 which is practically integral with the head 20; this spring is put under tension when the housing 17 is turned to close in the cutters in a way which will be hereinafter described; the spring serves to spread the cutters when their cutting action has been accomplished, and the period has arrived for withdrawing the cutters from the work. The shank 1, the internal member 2, and the head 20 make up the scroll and guide element heretofore referred to.

The bushing 19, as above described, is forced into the center of the ring 18 so that they are for all purposes integral. The bushing 19 is the member that together with the key 7 and pin 47, allows a limited relative movement between the scroll and guide element and the cutter holding element, and also locks these two elements together so that they will rotate together as a unit when the cutter holding element is rotated by the chuck. The bushing 19, as shown in Figs. 3, 3ª, and 4, is wide for about half the annular run and is narrow for the other half of the run. These proportions do not have to be exact, as the distance of the narrow part of the bushing only determines the relative movement allowed between the two elements; if this distance is either more or less than one-half of the circle of the bushing, then the relative movement is just so much greater or less and the cutters close in to a greater or less depth by the adjustable means 9 hereinafter described.

On one side of the bushing 19, as shown in Fig. 3, the wide run ends with an obliquely set notch 45 that forms a hook portion 46 and a cam portion 45ᵇ. At the opposite side of the bushing 19, the wide run ends with an abrupt shoulder 45ª. (Fig. 3ª.) When the chuck takes hold of the cutter holding element, as will hereinafter be described, and rotates it, there is an independent rotation of the cutter holding element as respects the scroll and guide element until the hook portion 46 of the bushing strikes the pin 47 of the key 7. This pin is, at this instant, lodging in the recess 47ª of the ring 3, (Fig. 17) which is an adjustable part of the stop element which will be more completely described hereinafter. The pin 47 is fast to the key 7 that slides lengthwise in the key way 47ᵇ of the shank 1. The hook 46 strikes the pin 47 and draws it into the oblique notch 45 so that now the cutter holding element and the scroll and guide element are locked together so that they rotate together until the chuck is reversed. This, as already explained, prevents the spring 26 being torn from its fastenings by reason of the rotation of the chuck not being reversed at the proper time.

The ring 3 is provided with a flange 48 that extends at an equal or substantially equal distance with the housing ring 18 and is hobbed around a portion of its periphery which engages with an adjusting screw 9 held in bearings in housing 6 through which passes the rod 22, the end of which is secured indirectly to the turret head of the machine. The ring 3, the flange 48, the adjusting screw 9, the housing 6, the rod 22, and the stop 12 comprise the stationary or stop element heretofore referred to. The housing 6 held by the rod 22 is immovable in rotation with respect to the shank 1, though it may have a longitudinal movement in unison therewith or independently thereof. The depth to which the cutters may cut the thread in the stud is regulated by means of the adjusting screw 9 which determines the relative amount of the rotation that results from the actuation of the chuck by changing the location of the recess 47ª in ring 3 with reference to the stop 12. As soon as the rotation of the chuck is reversed, the stock turning in the die or split nut turns the scroll and guide element and this carries along the cutter holding element by reason of the pin 47 engaging in the notch 45 of the bushing 19. When the pin 47 comes opposite the recess 47ª, the pin is shoved thereinto by the cam face 45ᵇ at the opening of the notch 45. The scroll and guide element is now locked with the ring 3 to a part of the stop or stationary element. The tension of the spring 26 carries the cutter holding element along until the stop 25 strikes the stop 12 that is part of the stop or stationary element. As hereinafter to be explained, the stops 12 and 25 are one way stops allowing rotation in one direction, but preventing rotation in the opposite direction. The cutter holding element is now locked from rotative movement and the depth to which the cutters are set is now fixed. By turning the adjusting screw 9, it is readily seen that the ring 3 with its recess 47ª is moved with respect to the stop 12 so that the location of the cutter holding element with respect to the scroll and guide element is changed, therefore, the cutters will close to a different depth.

The housing 6, the ring 3 on which it is journaled, and the adjusting screw 9 which engages 3 and 6, are held together by a spanner nut 5 run onto the threaded end of the ring 3, which projects toward the shank end beyond the housing 6; the ring 3, together with 6 and 9, is held in place by a spanner nut 4 run onto the shoulder at the first enlargement of the shank 1 and is revoluble thereon. An arm 27 couples the shank to a plug 49 which is adapted to be inserted in a second hole in the turret head; this arm and plug are modified to adapt the tool to any special style of rotary turret head. The rod 22 held by arm 27 holds the housing 6 and stop 12, the latter of which is splined in the bore of the housing 6 to prevent rotation therein and provided with a spring 13 and restricted as to its longitudinal movement through the bracket 6 by collar 11. The time of tripping stop 12, which governs the length of thread to be cut is regulated by the adjustable collar 39 held to the rod 22 by a set screw. A spring 14, engaging between the shoulder on the shank 1 and the turret head takes the shock between the tool and the turret. A spring 56 connects the housing 6 with the turret and prevents the tool being completely pulled out of the turret. A hardened collar 21 is inserted in the throat of the head, and forms a rub joint with the cutters 23, preventing dirt from entering the head 20. 25 is a chamfered projection extending radially from the housing 17 which engages against the chamfered nose 51 on the stop member 12 and whereby 17 may revolve indefinitely during the act of closing in the cutters, the stop 12 yielding lengthwise but the faces opposite the chamfered faces of these stop members prevent the back revolution of part 17 when the tool is revolved in the opposite direction to open out the cutters.

Pivoted on the face or front of housing 17 by screw 30 is a sector 29 which engages and disengages spring latch 31. The spring plunger 32, normally forced outward by spring 33, has an inclined projecting end which engages through an inclined opening 52 in the sector 29, a longitudinal movement of this plunger with its inclined forward end, due to the tool being pulled against the sleeve by the stock working in the internal member 2, oscillates the sector 29 and disengages the spring latch 31 that is held in by the sector engaging over the slight shoulder of the latch. The spring latch 31, when projected in the way described, is now in position to drop in a recess 35ª in the end of the sleeve 36 and this revolves the tool head with the chuck; but, as the spring latch 31 is chamfered on the back, the tool head is revolved by cam 35 in the direction to close the cutters only. When the direction of rotation of the chuck is reversed, the raised portion of the cam face on the end of the sleeve 36 strikes the chamfered face of the latch 31 and drives it down so that the shoulder of the latch passes the sector and the sector springs over the shoulder and holds the shoulder in the latch. The spring action of the sector is afforded by the spring 33 that controls the plunger 32; this spring has been put under tension when the latch was projected because the latch shoved the sector over and compressed the spring of the plunger by reason of the obliquely set head of the plunger.

The operation of the threading tool is as follows:—The shank 1 of the tool is inserted in one of the holes of the turret and held in place by the plug 49 and connecting arm 27, which connection is made to suit the special screw machine on which the tool is used. The tool is fitted with the proper cutters by removing the screws 28 which leaves housing 17 revoluble on head 20; independent of the ring 18 which is connected with the head 20 by the spring 26, then slipping the several cutters properly marked into their respective slots in 17, and revolve 17 about 20 so that the cutters will move in radially and to their proper depth after which screws 28 are replaced. The internal split nut (or spring die) 2 is set with respect to the length of the stud and thread to be cut and the machine is ready for operation. If an internal split nut is used, and not a spring die, the outer end of the stud screw 38 must be cut by an ordinary die which is set in any convenient hole of the turret head; but if the spring die is used, the two threads may be cut consecutively by the tool, the outer thread by the advance movement of the threading tool and the inner thread by its return, the spring die acting as a split nut when the tool is cutting the thread. Supposing that the part 2 be a split nut, as shown, the outer end of the stud 38 is threaded at another part of the turret by the ordinary die before mentioned, the stud is then nicked to a depth below the bottom of the thread to be cut as shown in Fig. 11, and, after being nicked, the die described herein is brought forward by the turret until the threaded end of the stud engages with 2. As the split nut 2 is restrained from revolving, the pin 47 being located in the recess 47ª, the threaded end of the stud pulls the tool forward until the cam face of sleeve 35 engages the inclined plunger 32 and releases the latch 31 by moving the sector 29. 31 now engages in the recess 35ª in the cam face 35, and the cam and the ring 17 now revolve together with the chuck. The rod has been nicked directly beneath the cutters, leaving room for them to close to their proper depth. As the scroll part of the tool is held stationary by the inter-engagement of the key 7 and the recess 47ª of the ring 3, the cutters 23 close in upon the nick until the hook 46 on the bushing 19 engages with the pin on the key 7, and pulls the key forward until the pin engages in the notch 46 and causes the body of the tool to turn with the bushing, thus causing split nut 2 and shank 1, which has a working fit in turret to turn with it. Meanwhile, the spring 26 has been wound sufficiently to return the head and open the cutters when this action shall be required subsequently. The entire tool now revolves in the ring 3 with the stud until the direction of the revolution of the chuck through which the rod 38 engages is reversed, when the tool is revolved by the action of internal member 2 engaging the thread on the outer end of the stud and the cutters now catch in the nick in the stud and help turn the tool with the stud 38 until the projection 25 strikes the stop 12. In the meantime, however, the pin on the key 7 has been brought directly in front of the recess in ring 3, and, owing to the slant of the hook in bushing 19, the pin 47 drops into the recess in the ring 3 thus keeping the split nut 2 from turning with stud. The pull of the spring 26 and the cutters closing in upon the stock completes the reverse rotation of the housing 17 after the pin 47 drops into the recess 47ª. The reverse rotation of the housing 17 is stopped by the stop 25 encountering the stop 12. The continued rotation of the stock while the scroll and guide element is held and the cutter holding element is held causes the tool to back away from the chuck by reason of the already threaded outer end engaging with the threads of the internal member 2, be it either the spring die or split nut. The cutters now cut into the end of the stud adjacent the nick and produce an even and accurate thread due to the influence of the guide of the same pitch—the split nut or spring die. The latch 31 has become disengaged from the cam 35 but in the meantime has been locked in its socket by the sector 29 which is given spring stress due to the obliquely set head of the spring pressed plunger 32, and is now ready to repeat the original operation with the next stud. The tool moves back until the stop 12 comes in contact with the adjustable stop 39 when the stop 12 is forced away from the housing 6 by reason of the collar 11 that is yieldingly projected outward from the rear of the housing 6 by the spring 13. The collar 11 and stop 12 are now held by the stop 39, while the housing continues to move backward with the tool compressing the spring 13 and gradually widening the space that separates the stop 12 from the front of the housing 6. At length sufficient space is afforded for the projection 25 to pass through and the spring 26 comes into action turning the head 17 back and opening the cutters until the shoulder 45ª on the bushing 19 comes in contact with the pin 47 resting in the recess 47ª which acts as a stop to its further revolution on the axis of the tool. The thread is now complete and the cutters have opened to allow the turret to repeat, withdrawing the tool from the stud 38 entirely. The stud is now threaded on both ends and only needs to be severed from the bar to finish it.

After the stud is cut from the bar, another portion of sufficient length to make a stud is fed through the chuck, when the same operations of nicking, threading outer end, then threading inner end by the tool just described and in the same way is repeated, and so on indefinitely, the turret of the machine presenting the different dies to the work at the proper time. To vary the depth of cutters, loosen spanner nut 5 which loosens the ring 3, then turn it in the proper direction by the adjusting screw 9 until the proper adjustment is made, when the spanner nut 5 is again tightened binding ring 3 and housing 6 together. To cut a different pitch of thread, the chasers are taken out and the proper ones put in as described, while the split nut is changed and adjusted to accord with the different work to be done. Different diameters of stud of the same pitch may be cut by simply changing given chasers to other slots in housing 17, as the pitch of the scroll is made to suit the difference in diameters, then insert a split nut of the proper diameter and pitch in the shank 1 and at the proper position to suit the work.

What I claim is:—

1. In a threading tool, in combination with a chuck adapted to hold a rod from which a stud is to be cut on the end projecting therefrom, expansible cutters, a threaded work guide contained within said tool adapted to engage the end of said rod while the cutters are in expanded position, and means for coupling the chuck and the tool and thereby actuating the cutters to close them against the rod, means for thereafter disengaging the chuck and the tool and means for holding the cutters against rotation and thereby cutting the thread on the rotating rod, substantially as described.

2. In a threading tool, in combination with expansible cutters, a spindle, a cutter holding head mounted on the spindle and adapted to rotate, a threaded guide carried by said spindle, means for rotating said cutter head with respect to said guide, a chuck adapted to hold a rod to be threaded with the end projecting therefrom, means for coupling the chuck and the cutter holding head and thereby actuating the head to close the cutters against the work, means for disengaging the cutter head and the chuck, and means for holding the cutter head against rotation during the threading period, substantially as described.

3. A threading tool, having in combination a scroll and threading guide element, a cutter holding element in which the cutters are opened and closed by relative movement between the said two elements, automatic means for connecting and disconnecting said cutter holding element with a rotating member to rotate the one element relatively to the other element a predetermined distance and automatic means for giving the cutter holding element the return rotative movement relative to the scroll and guide element, substantially as described.

4. A threading tool, having in combination, a scroll and threading guide element, a cutter holding element in which the cutters are opened and closed by relative movement between the two elements, rotating means automatically connectible with one of the elements to give the relative movement between the two elements and means for automatically connecting the two elements so that after a given relative rotation has taken place, the two elements rotate together until the rotating member is withdrawn, substantially as described.

5. A threading tool, having in combination, a scroll and threading guide element, a cutter holding element in which the cutters are opened and closed by relative movement between the two elements, rotating means automatically connectible with one of the elements to give the relative rotation between the two elements, means for automatically connecting the two elements so that after a given relative movement has taken place, the elements rotate together until the rotating means is withdrawn from the element to which it is connected and means for adjustably fixing the final relative location of one element to the other to vary the depths to which the cutters close under the influence of said automatically connectible rotating means and said automatic means for coupling the two elements together, substantially as described.

6. A threading tool, having in combination, means for cutting a thread comprising a plurality of radially closing and opening cutters and a member for spirally guiding the stock while said cutters thread the stock from the chuck end outward as the tool backs off the stock, substantially as described.

7. A threading tool, having in combination, means for cutting a thread upon the outer end of the stock as the tool advances upon the stock, and means for cutting a thread on an interior portion of the stock as the tool retreats from the stock under the spiral guidance of said first mentioned means, substantially as described.

8. A threading tool, having in combination, means for cutting a thread upon the outer end of the stock as the tool advances upon the stock, and means for cutting a thread on an interior portion of the stock as the tool retreats from the stock, the said first mentioned means guiding the stock spirally through the said second mentioned means, substantially as described.

9. A threading tool, having in combination, cutters, means for holding said cutters so that they close in upon the stock and open out from the stock, means for holding the stock and rotating the same, means for connecting said cutter holding means to said rotating means, means for rotating the cutter holding means reversely to the rotation imparted to it by the aforesaid rotating means, means operable in connection with both the rotating means and the means for affording reverse rotation to close and open the cutters and means for holding the cutters while the stock rotates to thread the stock, substantially as described.

10. In a threading tool, the combination of a rotating chuck in which the stock is held, an internal member supported in the tool and adapted to catch the stock and pull the tool forward toward the chuck, cutters, rotatable cutter holding means supported on the tool, a rotatable scroll head supported on the tool and in which the cutters engage, means for connecting the cutter holding means with the rotating chuck, as the tool advances so as to rotate the cutter holding means relative to the scroll head to close the cutters, means for holding the cutter holding means, the scroll head and internal member, when the chuck is reversed, and means for rotating the cutter holding means with respect to the scroll head at a determined time to open out the cutter, substantially as described.

11. In a threading tool, the combination of a rotating chuck in which the stock is held, an internal member supported in the tool and adapted to catch the stock and pull the tool forward toward the chuck, cutters, rotatable cutter holding means supported on the tool, and a rotatable scroll head supported on the tool and in which the cutters engage, means for connecting the cutter holding means with the rotating chuck, as the tool advances, so as to rotate the cutter holding means relative to the scroll to close the cutters, means for holding the cutter holding means, the scroll head and the internal member, when the chuck is reversed, and a spring put under tension by said relative rotation and adapted when released to afford reverse relative rotation between the members to open out the cutters, substantially as described.

12. In a threading tool, the combination of a rotating chuck in which the stock is held, an internal member supported in the tool and adapted to catch the stock and pull the tool forward toward the chuck, cutters, rotatable cutter holding means supported on the tool, a rotatable scroll head supported on the tool and in which the cutters engage, means for connecting the cutter holding means with the rotating chuck, as the tool advances, so as to rotate the cutter holding means relative to the scroll to close the cutters, means for holding the cutter holding means, the scroll head and the internal member, when the chuck is reversed, a spring put under tension by said relative rotation and adapted, when released, to afford reverse relative rotation between the members to open out the cutters, and means for connecting the cutter holding means with the scroll head when a prescribed relative rotation has taken place, substantially as described.

13. In a threading tool, the combination of a rotating chuck in which the stock is held, an internal member supported in the tool and adapted to catch the stock and pull the tool forward toward the chuck, cutters, rotatable cutter holding means supported on the tool, a rotatable scroll head supported on the tool and in which the cutters engage, means for connecting the cutter holding means with the rotating chuck, as the tool advances, so as to rotate the cutter holding means relative to the scroll head to close the cutters, means for holding the cutter holding means, the scroll head and the internal member, when the chuck is reversed, means for rotating the cutter holding means with respect to the scroll head at a determined time to open out the cutters, and means for varying the relative rotative change of position between the cutter holding means and the scroll head, substantially as described.

14. In a threading tool, the combination of a rotating chuck in which the stock is held, an internal member supported in the tool and adapted to catch the stock and pull the tool forward toward the chuck, cutters, rotatable cutter holding means supported on the tool, a rotatable scroll head supported on the tool and in which the cutters engage, means for connecting with the rotating chuck, as the total advances, so as to rotate the cutter holding means relative to the scroll to close the cutters, means for holding the internal member, the scroll head and the cutter holding means together as a unit, when the chuck is reversed, a one way stop arrangement adapted to allow free rotation in one way but adapted to hold one of said united members so as to hold all the members during the reverse rotation of the chuck so as to perform the threading operation, and means for rotating the cutter holding means reversely relative to the scroll at a prescribed time to open out the cutters, substantially as described.

15. In a threading tool, the combination of cutter holding means, provided with a stop, cutters carried thereby, means with which the cutters engage to open and close the same, a stop for engaging with the first mentioned stop and preventing rotation of the cutter holding means during the threading operation and a third stop for throwing out of engagement the first two mentioned stops and thereby stopping the threading operation, substantially as described.

16. In a threading tool, the combination of cutter holding means provided with a stop, cutters carried thereby, means with which the cutters engage to open and close the same, a stop for engaging with the first mentioned stop and preventing rotation of the cutter holding means during the threading operation, an adjustable third stop for throwing out of engagement the first two mentioned stops, whereby the length of stock threaded is controllable, substantially as described.

17. In a threading tool, the combination of cutter holding means, cutters carried thereby, means with which the cutters engage to open and close the same, a stop for holding against rotative movement during the threading operation, a second stop, a collar and sleeve fastened to the first mentioned stop and adapted to encounter the second stop when the tool slides, and a spring between the tool and first mentioned stop, whereby at a predetermined time the first mentioned stop is opened to allow rotative movement, substantially as described.

18. In a threading tool, the combination of a rotating chuck in which the stock is held, means for causing the tool to advance upon the chuck, cutters, cutter holding means, a scroll head in which the cutters engage, means for connecting the cutter holding means with the chuck to secure a one way rotation thereby, one way means for holding the cutter holding means, when the chuck is reversed, the said means comprising a stationary housing, a chamfered stop slidable in and out of said housing, and a chamfered stop on the cutter holding means, and means for holding the cutter holding means and the scroll head together during the holding engagement of the chamfered stops, substantially as described.

19. In a threading tool, the combination of a rotating chuck in which the stock is held, means for causing the tool to advance upon the chuck, cutters, cutter holding means, cutter controlling means with which the cutters engage to open and close them, and means for connecting and stopping the one way rotation of the cutter holding means and cutter controlling means comprising a stationary ring provided with a recess, a key slidable in the cutter controlling means and a pin lodgable in said recess, and a bushing attached to the cutter holding means and provided with a shoulder adapted to engage the pin lodged in said recess, substantially as described.

20. In a threading tool, the combination of a rotating chuck in which the stock is held, means for causing the tool to advance upon the chuck, cutters, cutter holding means, cutter controlling means with which the cutters engage to open and close the cutters, means for connecting the cutter holding means with the rotating chuck, and means for rotatably uniting the cutter holding means and the cutter controlling means at a predetermined time, comprising a key slidable in the cutter controlling means, a pin thereon, a ring provided with a recess in which the pin can lodge, a bushing attached to the cutter holding means provided with a hook and a notch and adapted to drag the pin out of the recess and into the notch when the limit of the desired relative movement is attained, substantially as described.

21. In a threading tool, the combination of a rotating chuck in which the stock is held, means for causing the tool to advance upon the chuck, cutters, cutter holding means, cutter controlling means with which the cutters engage to open and close the cutters, means for connecting the cutter holding means with the rotating chuck, and means for limiting the reverse rotative movement of the cutter holding means and the cutter controlling means and for also rotatably uniting the cutter controlling means and the cutter holding means at a predetermined point in the direct rotation, comprising a key slidable in the cutter controlling means, a pin thereon, a ring provided with a recess therein in which the pin can lodge, a bushing attached to the cutter holding means and provided with a narrow and a wide part joined at one end by a hook and notch and at the other end by a shoulder, whereby the notch, hook and pin serve to unite the two members, and the shoulder, pin and recess serve to unite the two members and hold them stationary in reverse rotation, substantially as described.

22. In a threading tool, the combination of a rotating chuck in which the stock is held, means for causing the tool to advance upon the chuck, cutters, cutter holding means, cutter controlling means with which the cutters engage to open and close the cutters, means for connecting the cutter holding means with the rotating chuck, means for limiting the reverse rotative movement of the cutter holding means and for also rotatably uniting the cutter controlling means at a predetermined point in the direct rotation, and a one way stop for holding the cutter holding means and the cutter controlling means united therewith, and means for varying the position of the reverse rotation limiting means with respect to the one way stop so as to vary the depth to which the cutters close, substantially as described.

23. A threading tool, having in combination with a turret, automatic means therein for threading one end of a stud, and automatic means in said turret for threading the other end of said stud, one of the means acting as a guide for the other means during the threading operation, substantially as described.

24. A threading tool, having in combination, a plurality of radially closing and opening cutters, and a spring die for cutting threads on one end of the stock and for guiding the stock while the cutters are threading another portion, substantially as described.

25. A threading tool, having in combination, a plurality of radially opening and closing cutters, means for opening and closing the same, and a spring die operable in connection therewith to thread a portion of the stock and guide the stock through the cutters to thread another portion, substantially as described.

26. A threading tool, having in combination a plurality of radially opening and closing cutters, automatic means for opening and closing the same, and an internal member adapted to engage one end of the stock and guide it through the cutters, substantially as described.

In testimony whereof, I sign this specification in the presence of two witnesses.

JOHN C. SMITH.

Witnesses:
  CHARLES F. BURTON,
  STUART C. BARNES.

---

Copies of this patent may be obtained for five cents each, by addressing the "Commissioner of Patents, Washington, D. C."